US007774498B1

(12) United States Patent
Kraemer et al.

(10) Patent No.: US 7,774,498 B1
(45) Date of Patent: Aug. 10, 2010

(54) METHODS AND APPARATUS FOR TRUSTED APPLICATION CENTRIC QOS PROVISIONING

(75) Inventors: Jeffrey A. Kraemer, Wellesley, MA (US); David James McCowan, Scituate, MA (US); Kerry E. Lynn, Sudbury, MA (US); Philip J. S. Gladstone, Carlisle, MA (US)

(73) Assignee: Cisco Technology, Inc., San Jose, CA (US)

( * ) Notice: Subject to any disclaimer, the term of this patent is extended or adjusted under 35 U.S.C. 154(b) by 947 days.

(21) Appl. No.: 11/593,289

(22) Filed: Nov. 6, 2006

(51) Int. Cl.
*G06F 15/16* (2006.01)
*G06F 15/173* (2006.01)
(52) U.S. Cl. .................... 709/240; 709/224; 726/13
(58) Field of Classification Search ............. 709/223, 709/224, 227, 232, 240; 726/13
See application file for complete search history.

(56) References Cited

U.S. PATENT DOCUMENTS

2003/0112782 A1 * 6/2003 Mizell et al. ............ 370/338
2004/0031056 A1 * 2/2004 Wolff ....................... 725/110
2005/0088977 A1 * 4/2005 Roch et al. ............... 370/254
2007/0280105 A1 * 12/2007 Barkay et al. ............. 370/229

* cited by examiner

*Primary Examiner*—Larry Donaghue
*Assistant Examiner*—Brian J Gillis
(74) *Attorney, Agent, or Firm*—Hickman Palermo Truong & Becker LLP

(57) ABSTRACT

A security agent extends the trust barrier, or trust point, from network gateway nodes to end user devices. A security agent operable to scrutinize network traffic executes on the user device and compares QoS marking attempts with the established QoS marking policy in effect. The security agent examines network traffic attributes deterministic of connection attempts by user processes. Attempts to apply inappropriate or disallowed QoS markings, as dictated by the QoS marking policy, are detected and disallowed. Therefore, only user connections consistent with the QoS marking policy are permitted into the network. Network admission control (NAC) mechanisms ensure that the security agent is the only access point from the user device to the secure network, and the security agent communicates the establishment of the trusted access point to the network gateway, thus ensuring that the network gateway may trust service level designations emanating from the user device executing the security agent.

24 Claims, 6 Drawing Sheets

METHODS AND APPARATUS FOR TRUSTED APPLICATION CENTRIC QOS PROVISIONING

BACKGROUND

In a secure network environment, secure transport services provide message traffic transport over trusted connections that offer assurances against interception, tampering or other unauthorized interference. Secure transport services begin and terminate at trust points in the network. The trust point defines a network location, typically a computing node, beyond which traffic is secure until exiting the trusted network at another trust point. A set of trust points effectively define a trust boundary into a network. The computing nodes defining a trust point may include routers, switches and gateways operable to interface the network with applications or processes attempting to communicate via the network. In particular configurations, a particular process or application executes on a computing node to define the trust point. Such a process or application is operable to oversee each connection into the network and provide assurances to the network that message traffic through the trust point is trusted.

In conjunction with secure transport, modern networks typically employ so-called "differentiated service" mechanisms to ensure that network traffic is appropriately classified according to the type of traffic and requirements of the user. Such differentiated service mechanisms provide different Quality of Service (QoS) levels to different connections and/or streams of packets. The different QoS levels are generally recognized by intermediate switching nodes for prioritizing network traffic appropriately. Thus, preferential users and/or types of traffic receive a higher priority while less exigent network traffic is carried at a lower priority.

In particular, network device vendors are deploying network devices operable according to a differentiated services model. Differentiated Services (DiffServ) is a new model in which traffic is treated by intermediate systems with relative priorities based on a type of services (ToS) field within an IP message packet. Defined in the Internet Engineering Task Force (IETF) Request for Comments (RFC) 2474 and RFC 2475, the DiffSery standard. increases the number of definable priority levels by reallocating bits of an IP packet for priority marking.

The DiffSery architecture defines the DiffSery (DS) field, which supersedes the ToS field in IPv4 to make per-hop behavior (PHB) decisions about packet classification and traffic conditioning functions, such as metering, marking, shaping, and policing. Particular vendors implement queuing techniques that can base their PHB on an IP precedence or Differentiated Services Code Point (DSCP) value in the IP header of a packet. Based on DSCP or IP precedence, traffic can be put into a particular service class. Packets within a service class are treated in a similar manner.

By way of technical background, the six most significant bits of the DiffSery field is called as the DSCP. The last two Currently Unused (CU) bits in the DiffSery field were left for future expansion in the DiffSery field architecture; these are now used as Explicit Congestion Notification (ECN) bits. Routers at the edge of the network classify packets and mark them with either the IP Precedence or DSCP value in a Diffserv network. Other network devices in the core (i.e. non-edge devices) that support Diffserv use the DSCP value in the IP header to select a PHB behavior for the packet and provide the appropriate QoS treatment.

Network administrators often employ trust and identity systems to implement secure transport mechanisms to ensure that only trusted users and devices adhering to corporate security policy can connect to an organization's network and send and receive data. Quality of Service (QoS) designations are included in this policy. For example, Network Admission Control (NAC) is an industry-wide collaboration led by Cisco Systems®, Inc., of San Jose, Calif., to proactively limit damage from worms and viruses, often referred to as "Malware." NAC ensures that every endpoint complies with network security policies before being granted network access. NAC program participants are typically leading security vendors in antivirus software and desktop management. NAC allows noncompliant endpoints to be denied access, placed in a quarantined area, or given restricted access to resources. The NAC approach allows network switching devices to implement a threat defense system according to the corporate security policy. Such a threat defense system ensures networks are designed to resist both external and internal attacks, and can recover quickly in the event an attack is launched. The threat defense system includes several technologies relevant to preventing outbreaks. For example, the Cisco Security Agent (CSA) product, marketed commercially by Cisco Systems®, Inc., of San Jose, Calif., employs behavior-based assessment to identify known and unknown attacks, and prevent malicious behavior targeted at endpoints.

SUMMARY

Configurations herein are based, in part, on the observation that network routing devices often do not employ quality of service (QoS) marking capability inherent in network devices due to possible misuse of the QoS marking field by untrusted applications. Network gateway nodes, or edge nodes, defining the edge of a secure (trusted) network may not be able to verify proper use of QoS marking fields by end user devices, or other remote nodes, according to a QoS marking policy, or security policy, by which trusted network nodes implement QoS criteria. The QoS marking, or service level designator, marks the header of message packets according to the appropriate QoS level and is recognized by subsequent network entities for applying the corresponding service level.

Unfortunately, conventional QoS marking mechanisms suffer from the shortcoming that the conventional markings are employable by unauthorized processes contrary to the established QoS marking policy in effect for the network. Individual processes, therefore, are capable of circumventing the QoS policy by arbitrary selective markings on message traffic packets to obtain preferential network treatment via heightened service levels (QoS levels). Accordingly, many conventional network devices may disable recognition of the QoS marking since the originator of the message traffic packets cannot be trusted to apply service level designators consistent with the QoS marking policy (i.e. QoS provisions of the applicable security policy). Therefore, conventional QoS marking may remain an enabled but unexploited resource of many network switching devices.

Conventional networking devices have long supported the use of DSCP markings in IP traffic as an identifier for providing Quality of Service designations when forwarding packets. QoS transport is often accomplished by using priority queuing to achieve the desired level of service. Unfortunately, this feature is seldom (if ever) employed in conventional systems. While particular devices support QoS, particular vendors may recommend that this feature be disabled. Further, in networks which do make use of QoS markings (for trusted devices, like routers or IP based phones), packets entering the network may be stripped of QoS markings (and re-assigned a network specified default value, like "scavenger" class), at the ingress point to the trusted network (e.g. the switch). One reason is that the network cannot trust that the hosts or applications which cause the packets to be marked are not in fact malicious. Abusive behavior can lead to network outages or denial of service for legitimate applications or hosts. For example, QoS abusive malware may specify and consume resources which should only be dedicated for legitimate high priority traffic. Configurations disclosed herein provide a trusted mechanism for controlling and trusting DSCP markings directly on an end node.

For example, conventional configurations provide a mechanism whereby the TCP/IP stack can be configured to mark packets for differentiated services on a per connection basis. There are several available Application Programming Interfaces (APIs) to allow an application to request a marking on behalf of itself or another process. Conventional QoS marking mechanisms, however, cannot provide assurances for aggregate DSCP markings for an end system (either provisioning legacy applications or de-provisioning applications attempting to used DSCP without administrative authorization) combined with securing the applications themselves.

Accordingly, configurations herein substantially overcome the shortcomings described above by extending the trust barrier, or trust point, from network gateway nodes to end user devices (user devices) such as PCs, PDAs, laptops, and other personal communication devices. A security agent operable to scrutinize network traffic executes on the user device and compares QoS marking attempts with the established QoS marking policy (security policy) in effect. The security agent examines network traffic attributes deterministic of connection attempts by user processes. Attempts to apply inappropriate or disallowed QoS markings, as dictated by the QoS marking policy, are detected and disallowed. Therefore, only user connections consistent with the QoS marking policy (security policy) are permitted into the secure network. The network admission control (NAC) mechanisms ensures that the security agent is the only access point form the user device to the secure network, and the security agent communicates the establishment of the trusted access point to the network gateway, thus ensuring that the network gateway may trust service level designations emanating from the user device executing the security agent. The combination of network access control focusing network access to a security agent operable to scrutinize network traffic according to the QoS marking policy, and communication of the establishment of trusted QoS markings to the rest of the network, allows the user device to perform QoS enabled communications enforceable over the network, because the network gateway receives assurances against inappropriate use of the service level designator contrary to the QoS marking policy.

In further detail, the method of identifying prioritized network traffic as disclosed herein includes establishing a trusted environment operable to scrutinize network traffic sent via a particular node, and communicating the establishment of the trusted environment to a data communication device coupled to a communications network. A security agent establishes a connection operable to transport network traffic to the communications network on behalf of a particular application, and selectively identifying network traffic corresponding to the particular application. The network traffic further comprises packets, in which each of the packets has a service level designator indicative of prioritized transport treatment according to a service level. The security agent marks the service level designator in packets transported over the identified connections with corresponding service level markings according to a marking policy having predetermined values for setting the service level designator.

In the exemplary configuration, establishing the trusted environment occurs on a user device, and includes executing a security agent on the user device operable for identifying connections corresponding to user applications on the user device, and scrutinizing all connections between the user device and the communications device, the communications device further comprising a network gateway operable to recognize and enforce the service level designator.

Establishing the trusted environment further includes executing a security agent on a user device, such that the security agent is operable to scrutinize network traffic emanating from the user device, and further operable to modify the service level designator. The security agent establishes a trusted connection from the security agent to a network gateway node, typically an edge device such as a switch or router, in which network gateway operable to enforce the service level designation throughout the network.

In particular configurations, the security agent sets a service level designator in each packet of network traffic, remote network entities responsive to a service level in the service level designator for determining traffic priority, and selectively enables recognition of the service level designator in the predetermined attributes of packets at remote network devices.

In the exemplary configuration, a rule engine determines the service level according to a quality of service (QoS) marking policy for packets corresponding to the particular application and network service, wherein the network is operable to apply the QoS appropriate treatment to message packets based on the determined service level.

The security agent encapsulates packets according to a stack, such that the stack is indicative of control field mapping between an end user format and a physical network format operable to transport a message payload between the physical network and a user application operable to process the payload. Computing the service level designator further includes identifying transport attributes below the stack, indicative of packet characteristics specific to physical transport protocols independent of the user application and user originating the packets, and identifying transport attributes above the stack, indicative of packet characteristics independent of the transport source, destination, and protocol employed for the message packet.

The exemplary configuration effectively extends a trust boundary indicative of the extent of the trusted network from the network device to a user device, such that the user device is operable for quality of service (QoS) operation responsive to the service level designator. The security agent asserts, from the user device, that the security agent on the user device is operable to scrutinize packets emanating from the user device, and identifies, for each connection from the user device, a service level indicative of a service level setting operable to be stored in the service level designator. End systems which are not considered "trusted" can either be denied access to the network (which is consistent with conventional NAC provided security) or can have their DSCP (QoS) markings stripped by the ingress into the trusted network.

In the exemplary arrangement, the service level designators define QoS markings, further comprising overriding QoS markings placed by a user application, the QoS markings replaced with markings corresponding to a security policy, the security policy based on at least one of the source, destination, application, protocol, port and user corresponding to a particular application.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
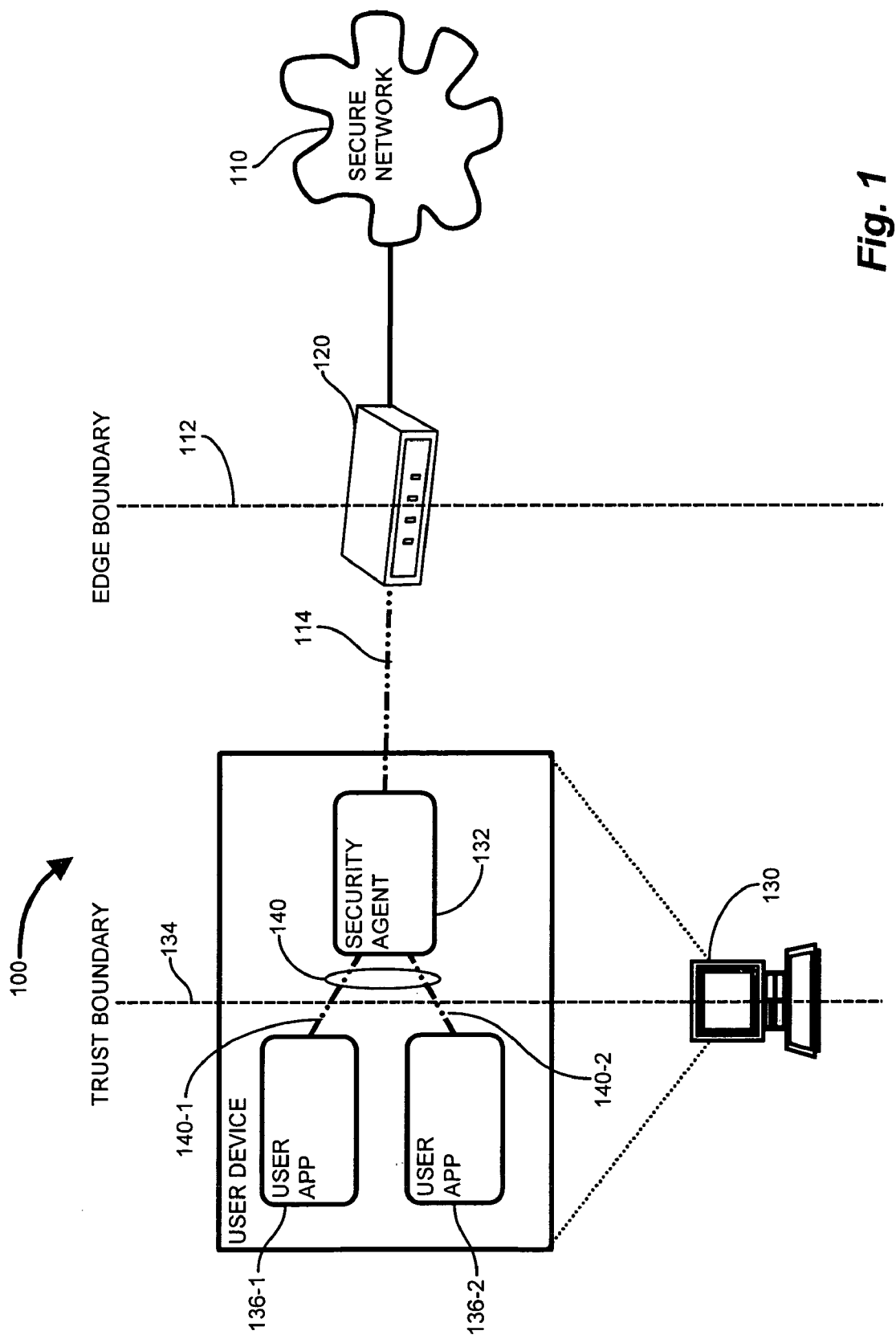
FIG. 1 is a context diagram of an exemplary managed information environment including a secure network suitable for use with the present invention.

Configurations disclosed herein combine deployment of a QoS proxy on an end node is to control DSCP markings for all packets transmitted, and implementation of a stateful reference monitor which tracks behavior and enforces security across different types of resource access. The exemplary configuration described below specifies a mechanism for providing a trusted QoS proxy on an end-node system. The arrangement includes a QoS proxy which implements security features, via the security agent, protecting both the applications and the operating system (OS), to ensure both the application usage as well as the QoS markings may be considered trusted by the network. Providing the trusted proxy includes detecting a network "connection" being established (including TCP, UDP, etc.), a policy based rule check (which results in an administratively specified DSCP marking for this session), tracking all packets for this "session" and marking them according to the specified marking policy. In an MS Windows arrangement, the security agent accomplishes such scrutiny of connections by intercepting network traffic both above and below the TCP/IP stack (using Transport Driver Interface (TDI) and Network Driver Interface Specification (NDIS) drivers respectively). In alternate arrangements, other types of operating systems (i.e. Solaris, LINUX), may provide similar functionality in comparable locations (named differently) in the specific stack implementations In the particular configuration discussed below, the security agent operation may be fulfilled by the Cisco Security Agent product, marketed commercially by Cisco Systems, Inc., of San Jose, Calif. In such particular configurations, a TDI filter driver, which resides above the TCP/IP stack (and has application context) records "socket" binding information on a per process basis. The TDI filter driver handles connection related events for each session, and also tracks listen queues to associate incoming connections with the correct process. When a new connection is established, TDI makes a rule request to a rule engine responsive to the security policy in effect.

The rule engine indicates whether or not the connection should be allowed or denied. If the connection is allowed, an administratively specified DSCP marking can also be provided by the rule engine for the session. The rule engine can also indicate no marking (allowing for the application to specify its own desired DSCP values).

TDI tracks the session n-tuple, and sends a configuration message to an NDIS packet driver, indicating all packets for this session should be marked with the specified DSCP marking. The NDIS driver will also maintain a list of session n-tuples (managed by TDI), based on attributes of packets sent via a particular connection. Each transmitted packet can be mapped to one of these sessions. The packet is modified as need to reflect the specified DSCP markings. (e.g. for IPV4 the ToS field in the IP header is modified).

Additionally, when accepting incoming TCP connections (where the session may actually be accepted by the stack before TDI receives any notification), the NDIS packet driver makes a rule request to the rule engine to both authorize the connection as well as ensuring all packets meet the specified marking. For example, if the network were suffering a packet based denial of service, not marking all traffic could prevent session establishment, in contrast to conventional mechanisms (For the purposes of providing an exemplary configuration, a Microsoft Windows® implementation has been described. A similar mechanism is used for both Linux and Solaris®.) While this aspect controls how packets will be marked, and restricts these connections to specified applications, the security agent also addresses the issue of trusting the applications themselves.

A second aspect involves protecting the integrity of both the OS and applications running on the end node. Configurations herein achieve this protection by implementing a stateful reference monitor which tracks behavior and enforces security across different types of resource access. By either preventing or detecting malware from running or impersonating authorized applications, the security agent ensures that the traffic which will be marked is considered valid.

Trusted applications can be protected by preventing unauthorized modifications to the binaries (i.e. executable) themselves or the processes as they execute. Untrusted or compromised applications can also be detected. This may be done by observing malicious or unusual behavior, e.g. detecting code injection, the modification of process memory, modification of the system configuration, the execution of mobile code, etc. In addition to untrusted applications, a compromised OS can also be detected (e.g. rootkits, skinny stacks, etc.).

Therefore, the disclosed security agent combines the operation of securing the applications combined with directly control of all DSCP markings Such control prevents malicious or other unauthorized use of QoS on the network. The network can trust that only protected and authorized applications are marking traffic for QoS. Integration of the security agent and NAC ensure that only compliant QoS nodes are allowed onto the network. Other nodes may be allowed onto the network, but the switches may be configured to dishonor packet markings from untrusted hosts, and optionally, to remark them with QoS markings consistent with the security policy The attributes of scrutinized network traffic include the application and user, or so-called "above the stack" attributes, and the network IP attributes including "below the stack" attributes of source and destination address and port, and transport type. By implementing network interceptor drivers both above and below the native TCP/IP stack, network sessions may be associated with an application and the associated DSCP marking for these sessions can be controlled. The user applications can also be protected and verified to establish a level of trust that only authorized applications may make use of QoS markings. In other words, configurations discussed herein provide the ability to control differentiated service markings for any or all packets transmitted by a host.

FIG. 1 is a context diagram of an exemplary managed information environment including a secure network suitable for use with the present invention. Referring to FIG. 1, an exemplary managed information environment 100 includes a secure, or trusted, network 110. A trusted router, switch, or other network gateway 120 device provides security for network access, and therefore defines a trusted edge boundary 112 for the secure network 110. Edge devices, such as the network gateway 120, often delineate a threshold to networks or subnetworks from user devices or other networks. The threshold may demarcate a logical or physical boundary to the secure network, and therefore may employ features such as Virtual Private Network (VPN) technology, firewalls, tunneling mechanisms, authentication, encryption and other security enhancements. Therefore, the secure network 110 is typically characterized by a set of interconnected nodes enforcing a common routing and security policy, discussed further below, for which the edge devices, such as the gateway 120, define the external trusted boundary 112 of connection points into the secure network 110.

Configurations herein extend the secure nature of the trusted edge boundary 112 to a user device 130 executing a security agent 132. The security agent 132 scrutinizes connections 140 into the secure network 110, effectively extending the trusted edge boundary 112 to a trust boundary 134 defined by the user device 130. The security agent 132 performs access control for attempted connections 140 from user applications 136-1 . . . 136-2 (136, generally). The connections 140-1 . . . 140-2 (140 generally) transport packets operable for differentiated treatment via service level designations. Therefore, the user applications 136 attempt QoS enabled connections 140-1 . . . 140-2 for specifying service level designations (i.e. QoS markings, or labels) for network traffic carried via the connections 140. The security agent 132, employing principles discussed further below, selectively allows connections 114 operable for service level designations from the emanating user application 136. In the exemplary configuration shown, the security agent 132 permits connection 140-1 as an allowed connection 114, however disallows attempted connection 140-2, as shown by the respective dotted lines.

Figure 2:
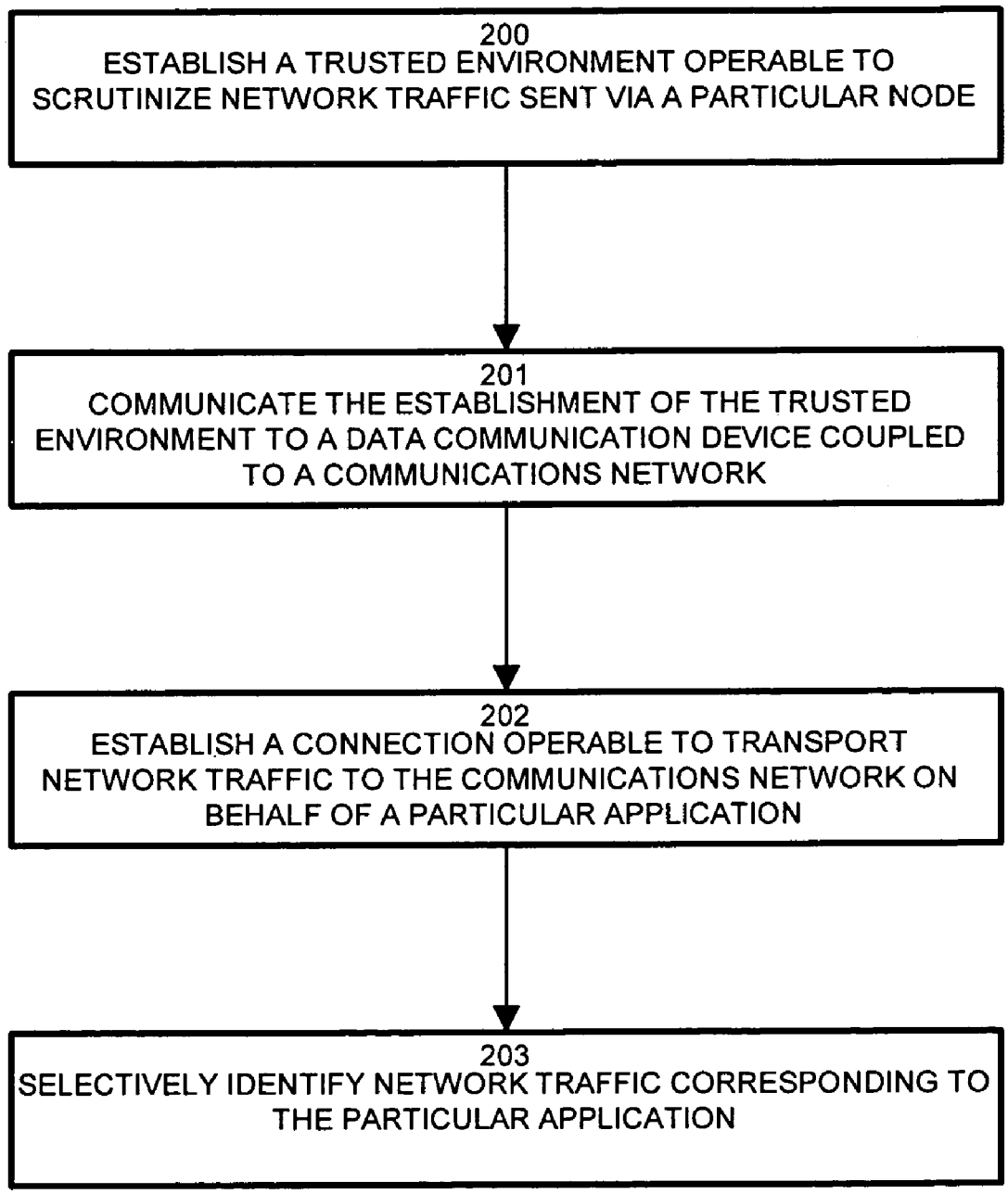
FIG. 2 is a flowchart of trusted QoS marking in the environment of FIG. 1.

FIG. 2 is a flowchart of trusted QoS marking in the environment of FIG. 1. Referring to FIGS. 1 and 2, the method of identifying prioritized network traffic includes, at step 200, establishing a trusted environment operable to scrutinize network traffic sent via a particular node. The security agent 132 communicates the establishment of the trusted environment to the network gateway device 120 or other data communication device coupled to a trusted communications network 110, as depicted at step 201. The security agent 132, therefore indicates the "trust environment" to user device 130, which may be the network gateway device 120 (edge device) or another machine residing within the secure network 110. The network gateway 120 then extends the trusted boundary to the user device 130 (node) running the security agent software. The network gateway device 120 allows traffic from the user device 130 (node under user control) to pass onto the secure network 110 unmodified. The receiving network gateway 120 therefore knows it may trust connections 114 emanating from the user device 130. The user device 130 establishes a connection 140-1 operable to transport network traffic to the communications network 110 on behalf of the particular user application 136-1, as shown at step 202, and the security agent 132 selectively identifies network traffic corresponding to the particular application 136-1, as shown at step 203. Therefore, the security agent 132 intercepts and scrutinizes all connection attempts from the user applications 136, and is therefore operable to allow or disallow connections to the secure network 110.

Figure 3:
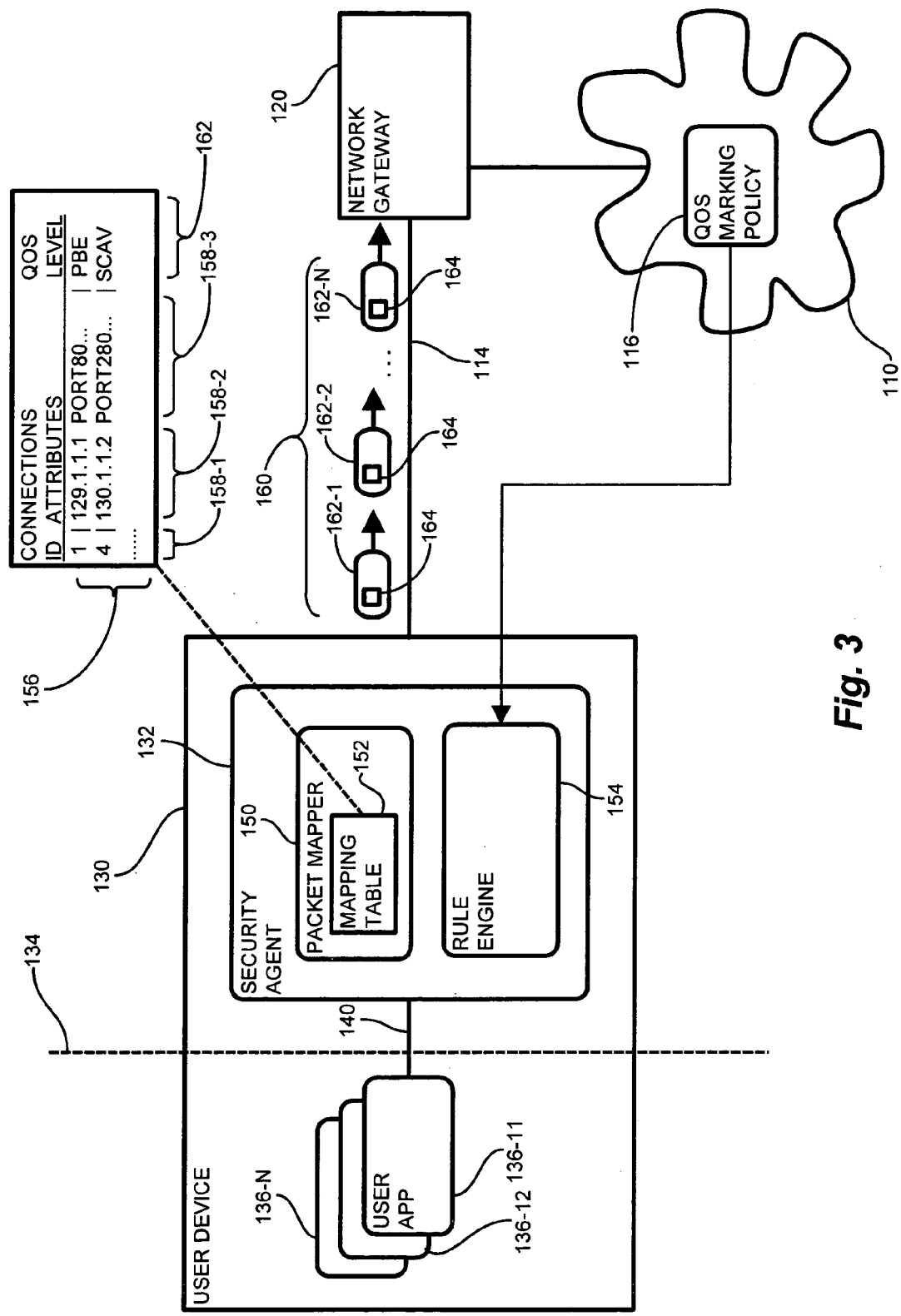
FIG. 3 is a block diagram depicting trusted QoS marking.

FIG. 3 is a block diagram depicting trusted QoS marking. Referring to FIGS. 1 and 3, in the exemplary configuration, the security agent 132 is operable to extend the trust boundary 134 using a packet mapper 150 having a mapping table 152 and responsive to a rule engine 154 for computing applicable service levels. Each connection 140 from a user application 136 has an applicable service level for a stream of packets 160 transported via the particular connection 140. Alternatively, different packets 162 within a connection may have packet specific service levels. In an exemplary configuration, the mapping table 152 has entries 156 for each connection 140, and correlates connection attributes such as destination (or source) IP address 158-2 and port ID 158-3 for each entry 156, indexed by connection ID 158-1. For each connection 158-1, the mapping table 152 indicates the applicable service level 162 determining the appropriate QoS treatment for that connection 140. Alternate mapping mechanisms for packets and connections may be employed. The rule engine 154 computes the applicable service level 162 from the attributes 158, and updates the entries 156 as appropriate (i.e. during connection setup and teardown).

The rule engine 154 derives applicable rules based on a QoS marking policy 116, applicable across the secure network 110, typically as part of a security and/or routing policy also applicable to the secure network 110. The user applications 136 apply a service level designator 164 to each packet 162 in a stream of packets 160 to specify a particular service level treatment. The security agent 132 scrutinizes the service level designators 164 to ensure the appropriateness of the user application 136 requested service level and may override or supercede the requested level if it is not appropriate. Therefore, the security agent 132 ensures that user applications 136 are not able to inappropriately invoke QoS designations by generating packets 162 with service level designators 164 in excess of that permitted by the QoS marking policy 116.

As an example, consider a corporate telephone installation employing a network that supports limited QoS to enable IP telephony. The voice phones mark packets for voice. The switches are able to recognize the embedded devices (by observing other traffic originating from the device and inferring the device is in fact a phone). The switches allow theses packets to be forwarded unmodified onto the network where the markings are honored for priority queuing. For traffic originating from any other device (e.g. a PC), all packets are remarked (and downgraded) by the switch. Pre-specified trusted MAC addresses could also be used. Either scheme could be spoofed.

Configurations presented herein combine the ability to control DSCP markings for any or all packets transmitted by a host with Network Admission Control. NAC can ensure that only trusted (for QoS purposes, security agent protected) hosts are allowed onto the network. This allows the network devices (such as network gateway 120) to trust and honor the markings from these hosts (such as user devices 130).

In a particular configuration, the disclosed security agent 132 is operable to control network access based upon packet attributes, such as application, network service, IP address. In addition to allowing or denying these connections, the security agent 132 may provision (or de-provision) DSCP markings in packets based upon administratively specified policy. These policies can control QoS settings on a per application and protocol basis. The security agent 132 can also ensure the integrity of these applications (to make sure they are not modified). The security agent 132 may therefore reliably control all DSCP marking from a user device 130 (host), and may prevent malware or non-business applications from exploiting QoS on the network. Further, the IP traffic for an IP phone application 136 running on the user device 130 may also be marked (or provisioned) as voice traffic.

When a host (e.g. user device 130) connects to a switch (or other network device 120), the switch can verify (via NAC) that the security agent 132 is running and enforcing security policies on the host. If the host is trusted, the DSCP markings will be left unchanged. If the host is not trusted, the switch can re-mark packets (e.g. to scavenger class). The arrangement provides QoS by combining DSCP provisioning and enforcement on a host with a security agent 132 which can be trusted by the network 110 for enforcing network security policies (e.g. via a mechanism like NAC). If the network 110 can trust the markings from the host are "authorized" by the security software, they can be allowed onto the network 110 (without modification).

Figure 4:
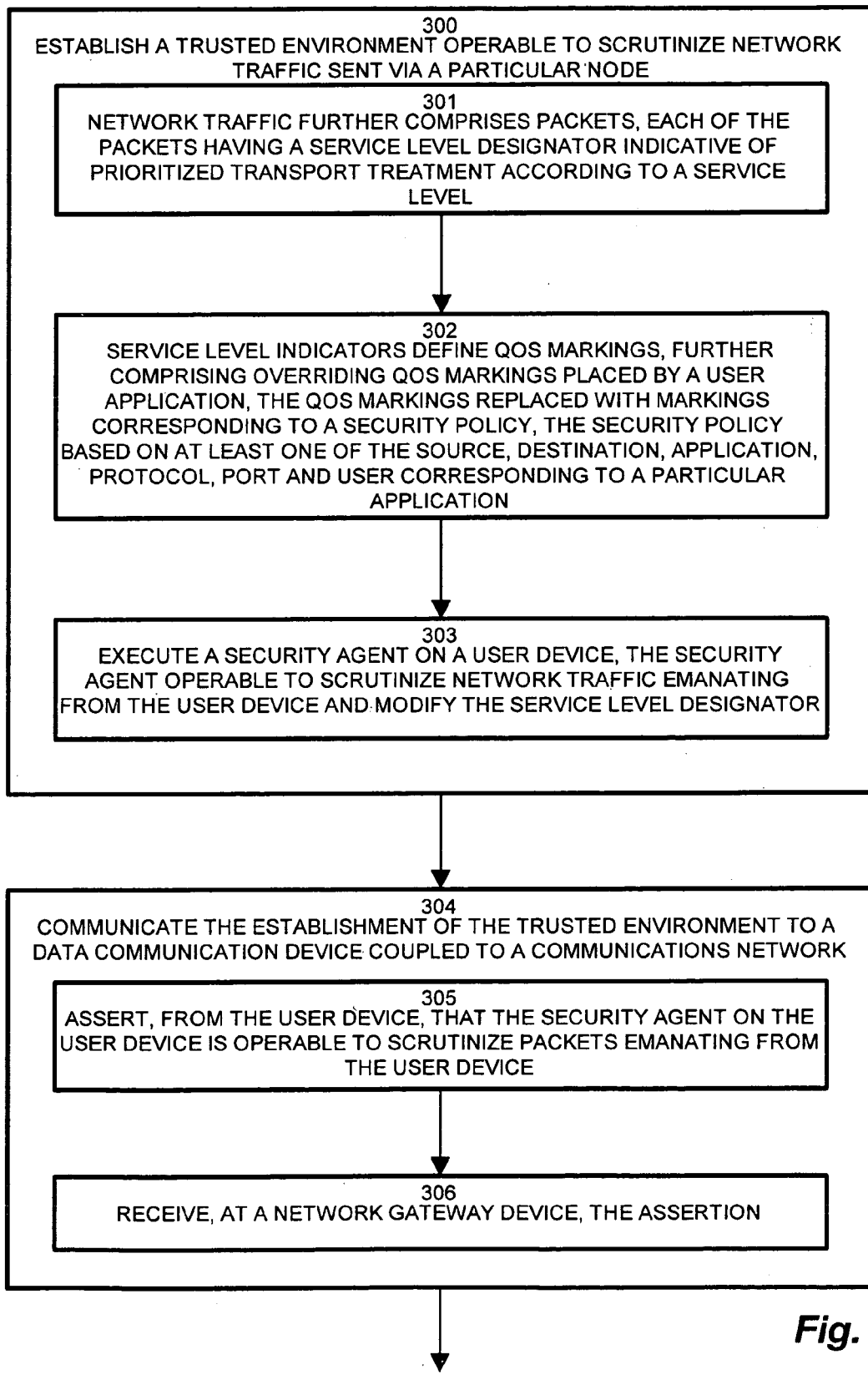
FIGS. 4-6 are a flowchart of connection establishment for trusted QoS marking in the environment of FIG. 3.
Figure 5:
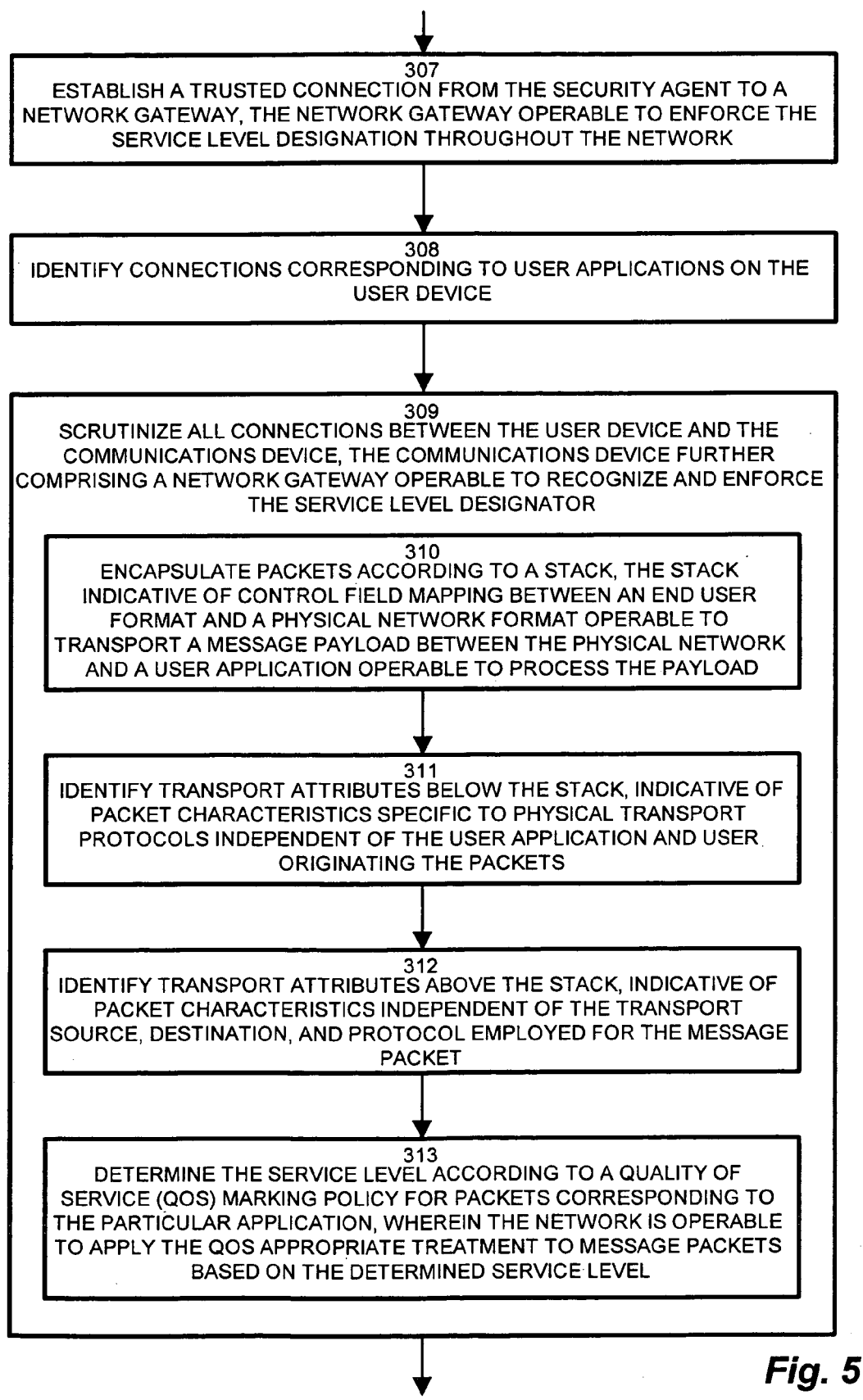
Figure 6:
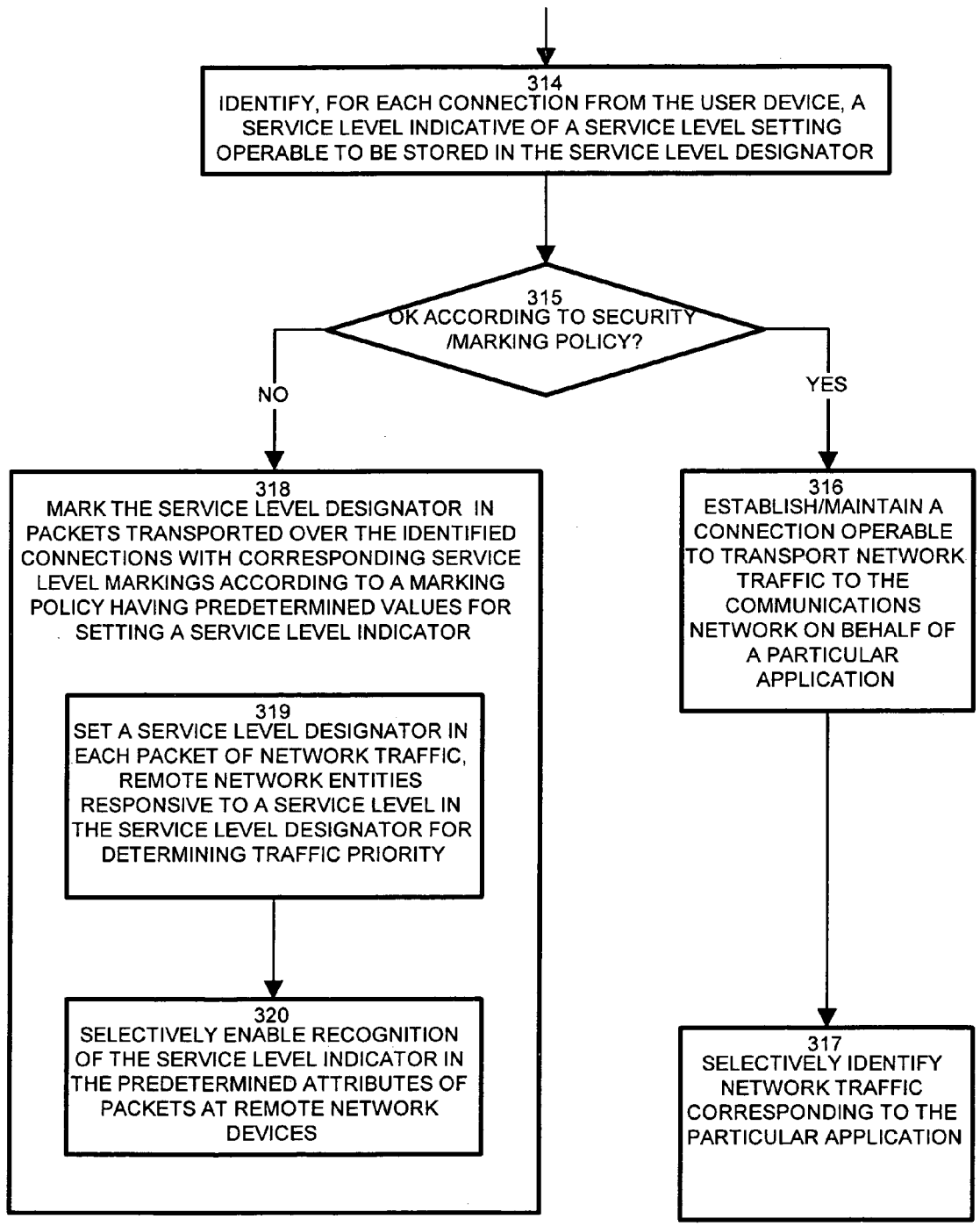

FIGS. 4-6 are a flowchart of connection establishment for trusted QoS marking in the environment of FIG. 3. Referring to FIGS. 3-6, the security agent 132 executing on the user device 130 establishes a trusted environment operable to scrutinize network traffic sent via a particular node, as depicted at step 300. The trusted environment extends the trust boundary 134 indicative of the extent of the trusted network from the network device (i.e. network gateway 120) to the user device 130, such that the user device 130 is operable for quality of service (QoS) operation responsive to the service level designator 164. The network traffic 160 further includes packets 162, in which each of the packets 162 has a service level designator 164 indicative of prioritized transport treatment according to a service level, as depicted at step 301. The service level designators define QoS markings, and may include overriding QoS markings placed by a user application 136, such that the QoS markings are replaced with markings corresponding to a security policy (i.e. QoS marking policy 116), as depicted at step 302. The security policy may be based on at least one of the source, destination, application, protocol, port and user corresponding to a particular application, or other attributes enumerable in the mapping table 152, as appropriate to the secure network 110. In the exemplary configuration, establishing the trusted environment occurs on a user device 130, and further includes executing the security agent 132 on the user device 130, such that the security agent 132 is operable to scrutinize network traffic 160 emanating from the user device 130, and is further operable to modify the service level designator 164, as depicted at step 303. This approach therefore extends the trust boundary 134 by invoking the security agent 132 to communicate to the network 110, which indicates to the edge device 120 to extend the trust boundary 134 by allowing the packets 162 to pass unmodified (i.e. without striping/replacing the original QoS markings as the packets 162 pass through the edge device 120).

Having covered network access paths from the user device 130 to the network gateway 120 (edge device), the security agent 132 communicates the establishment of the trusted environment to a data communication device, such as the network gateway 120, coupled to a communications network 110, as depicted at step 304. The security agent 132 therefore asserts, from the user device 130, that the security agent 132 on the user device 130 is operable to scrutinize packets 162 emanating from the user device 130, as shown at step 305. Consequently, the secure network 110 receives, at a network gateway device, the assertion, as shown at step 306, thus extending the trust boundary 134 to the user device 130. As indicated above, conventional mechanisms are unable to provide assurances of securing each potential network path from the user device 130 to the secure network 110; in contrast, in the exemplary configuration, the security agent 132 employs NAC to effectively scrutinize the access paths.

The security agent 132 establishes a trusted connection from the security agent 132 to the network gateway 120, such that the network gateway 120 is operable to enforce the service level designation 164 throughout the network, as depicted at step 307. Since the network gateway 120 encompasses the trusted edge boundary 112, and since the network gateway now "trusts" the user device 130, the network gateway may effectively "vouch" for the communications from the user device 130. Alternatively, the security agent 132 may also implement trusted operation by communicating with another node, such as a management console or access control policy server, which is operable to configure the network gateway 120.

Subsequently, the security agent 132 identifies connections 140 corresponding to user applications 136 on the user device 130, as depicted at step 308. The security agent 132 scrutinizes all connections 114 between the user device and the communications device, in which the communications device further comprising the network gateway 120 operable to recognize and enforce the service level designator 164, as disclosed at step 309. In the exemplary configuration, employing IP packets, the security agent 132 encapsulates packets 162 according to a stack, in which the stack is indicative of control field mapping between an end user format and a physical network format operable to transport a message payload between the physical network and a user application that processes the payload, as depicted at step 310. In the exemplary configuration, the stack is an ISO 7 layer stack known to those of skill in the art of network management. Alternate stack, mapping and encapsulation mechanisms may be employed.

Employing the stack arrangement, computing the service level designator 164 further includes identifying transport attributes 158 below the stack, in which the transport attributes 158 are indicative of packet characteristics specific to physical transport protocols independent of the user application 136 and user originating the packets, as shown at step 311. Further, the security agent 132 identifies transport attributes 158 above the stack, in which the attributes 158 are indicative of packet 162 characteristics independent of the transport source, destination, and protocol employed for the message packet 162, as disclosed at step 312. In the exemplary configuration, the security agent 132 observes the connections 140 below the stack at a network socket level, and identifies the following attributes, known as a so-called "5-tuple": source and destination address, source and destination port, and protocol, typically TCP or UDP. The above the stack attributes include the application and the user. Employing these attributes 158 in the mapping table 152, the security agent 132 invokes the rule engine 154 for determining the service level according to the quality of service (QoS) marking policy 116 for packets 162 corresponding to the particular application 136, such that the network 120 is operable to apply the QoS appropriate treatment to message packets 162 based on the determined service level 164, as depicted at step 313. Therefore, above the stack, user, application and connection information is available. The security agent 132 employs these attributes to figure out the policy to enforce. Below the stack, the security agent 132 identifies the packets 162 based upon the connection information and marks the packets 162 accordingly. Since the connection information it is located both above and below the stack, this provides the mapping of the marking policy 116 to actually marking the appropriate packets 162 at the connection level.

The security agent 132 identifies, for each connection 140 from the user device 130, a service level indicative of a service level setting operable to be stored in the service level designator 164, as shown at step 314. Depending on the operation of the user application 136, the service level designator 164 may be already written by the user application 136. The security agent 132 compares any service level designation 164 written by the user application 136 to check and ensure that the designator 164 is consistent with the QoS marking policy 116, as shown at step 315. Alternatively, the security agent 132 may mark each service level designator 164 with the identified service level. If the service level designator 164 agrees with the identified level from the rule engine 154, then the security agent 132 establishes and/or maintains the connection 114 operable to transport network traffic to the communications network 110 on behalf of a particular application 136, as shown at step 316. The security agent 132 continues selectively identifying network traffic 160 corresponding to the particular application 136 via the packet mapper 150, as shown at step 317.

In contrast, if an application 136 written service level designator 164 does not agree with the QoS marking policy 116, then the security agent 132 marks (typically downgrading) the service level designator 164 in packets 162 transported over the identified connections 114 with corresponding service level markings according to the marking policy 116 having predetermined values for setting the service level designator 164, as depicted at step 318. Accordingly, the security agent 132 sets the service level designator 164 in each packet 162 of network traffic, such that remote network entities are responsive to a service level in the service level designator 164 for determining traffic priority, as disclosed at step 319. Individual remote network entities may also selectively enable recognition of the service level designator 164 in the predetermined (from the QoS marking policy 116) attributes of packets 162 at remote network devices, rather then the conventional practice of disabling service level designator 164 recognition due to untrusted user applications 136.

Various alternative arrangements will be apparent to those of skill in the art, including but not limited to the following:

Decisions on how to mark a session can take the application, user, and/or the network service into account (by tracking connection establishment above the TCP/IP stack in the context of the application). Packets associated with these connections can be marked according to administratively defined policy (as opposed to what is done by default from the OS or per application request). This can be done efficiently by a filter driver which resides below the TCP/IP stack, thus dramatically improving performance. Other mechanisms (such as making system API calls on behalf of an application based upon policy) have very poor performance characteristics and typically may only be accomplished after the session has been established.

All transmitted packets may be properly marked according to the marking policy, in contrast to other mechanisms, e.g. where an existing flow is configured or where the TCP/IP stack accepts the connection (and completes the 3-way handshake) before the application is notified. Not marking all packets associated with a connection can potentially prevent a session from being established when the network is under load (possibly due to an attack).

Authorized QoS aware applications can be allowed to function unimpeded. Authorized legacy (non-QoS aware) applications can be provisioned by proxy. Unauthorized applications attempting to use QoS can be de-provisioned. Both the OS and authorized QoS applications can be protected. Ensuring only proper traffic may be marked. This protection may either prevent or simply detect a compromise.

The disclosed configuration may used to mark sensitive traffic in a manner which allows network devices (e.g. routers) to ensure critical network services can continue to function, even in the face of a network bandwidth based attack Those skilled in the art should readily appreciate that the programs and methods for designating QoS traffic as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for designating QoS traffic has been particularly shown and described with references to embodiments thereof, it will be understood by those skilled in the art that various changes in form and details may be made therein without departing from the scope of the invention encompassed by the appended claims.

What is claimed is:

1. A method of identifying prioritized network traffic comprising:
    establishing a trusted environment operable to scrutinize network traffic sent via a particular node;
    communicating the establishment of the trusted environment to a data communications device coupled to a communications network;
    establishing a connection operable to transport network traffic to the communications network on behalf of a particular application; and
    selectively identifying network traffic corresponding to the particular application;
    setting a service level designator in each packet of the network traffic that is sent via the particular node; wherein the particular node is responsive to a service level in the service level designator for determining traffic priority;
    selectively enabling recognition of the service level designator in predetermined attributes of packets sent via the particular node;
    wherein the method is performed by one or more processors.

2. The method of claim 1 wherein the network traffic further comprises packets, each of the packets having the service level designator indicative of prioritized transport treatment according to the service level.

3. The method of claim 2 wherein establishing the trusted environment occurs on a user device, further comprising executing a security agent on the user device, the security agent operable for:
    identifying connections corresponding to user applications on the user device;
    scrutinizing all connections between the user device and the data communications device, the data communications device further comprising a network gateway operable to recognize and enforce the service level designator; and
    marking the service level designator in packets transported over the identified connections with corresponding service level markings according to a marking policy having predetermined values for setting the service level designator.

4. The method of claim 3 wherein establishing the trusted environment further comprises:
    executing the security agent on the user device, the security agent operable to scrutinize network traffic emanating from the user device, and further operable to modify the service level designator; and
    establishing a trusted connection from the security agent to the network gateway, the network gateway operable to enforce the service level designation throughout the communications network.

5. The method of claim 4 further comprising determining the service level according to a quality of service (QoS) marking policy for packets corresponding to the particular application, wherein the communications network is operable to apply the QoS appropriate treatment to message packets based on the determined service level.

6. The method of claim 5 further comprising encapsulating packets according to a stack, the stack indicative of control field mapping between an end user format and a physical network format operable to transport a message payload between the communications network and a user application operable to process a payload.

7. The method of claim 6 wherein computing the service level designator further comprises:
    identifying transport attributes below the stack, indicative of packet characteristics specific to physical transport protocols independent of the user application and user originating the packets; and
    identifying transport attributes above the stack, indicative of packet characteristics independent of transport source, destination, and protocol employed for the message packet.

8. The method of claim 7 wherein the predetermined attributes above a stack are indicative of a particular user and application corresponding to a particular connection, and the predetermined attributes below the stack are indicative of a protocol, port and addresses corresponding to the particular connection.

9. The method of claim 2 further comprising extending a trust boundary indicative of an extent of a trusted network from the particular node to a user device, the user device operable for quality of service (QoS) operation responsive to the service level designator.

10. The method of claim 9 further comprising:
    asserting, from the user device, that a security agent on the user device is operable to scrutinize packets emanating from the user device;
    receiving, at a network gateway device, the assertion; and
    identifying, for each connection from the user device, the service level indicative of settings operable to be stored in the service level designator.

11. The method of claim 10 wherein the service level designators define QoS markings, further comprising overriding QoS markings placed by a user application, the QoS markings replaced with markings corresponding to a security policy, the security policy based on at least one of source, destination, application, protocol, and port corresponding to the particular application.

12. The method of claim 9 wherein extending the trust boundary is performed by:
    informing a network gateway of establishment of a secure environment in the user device, the network gateway defining an edge device of the trusted network;
    maintaining, in response to establishment of the trusted environment, service level markings in packets emanating from the user device.

13. A data communications device for identifying prioritized network traffic comprising:
    one or more processors;
    a network node device operable to couple to an edge device for establishing a trusted environment operable to scrutinize network traffic sent via a particular network node;
    a security agent operable to communicate the establishment of the trusted environment to a data communications device coupled to a communications network, the security agent further adapted to establish a connection operable to transport network traffic to the communications network on behalf of a particular application; and
    a packet mapper in the security agent operable to selectively identifying network traffic corresponding to the particular application; setting a service level designator in each packet of the network traffic that is sent via a particular node; wherein the particular node is responsive to a service level in the service level designator for determining traffic priority; selectively enabling recognition of the service level designator in predetermined attributes of packets sent via the particular node.

14. The device of claim 13 wherein the network traffic further comprises a stream of packets, each of the packets having the service level designator indicative of prioritized transport treatment according to a service level.

15. The device of claim 14 wherein the security agent is further operable to:
 identify connections corresponding to user applications on a user device;
 scrutinize all connections between the user device and the data communications device, the data communications device further comprising a network gateway operable to recognize and enforce the service level designator;
 mark the service level designator in packets transported over the identified connections with corresponding service level markings according to a marking policy having predetermined values for setting a service level designator.

16. The device of claim 15 wherein the user device is further operable to establish the trusted environment by:
 executing the security agent on the user device, the security agent operable to scrutinize network traffic emanating from the user device, and further operable to modify the service level designator, the security agent further operable to establish a trusted connection from the security agent to a network gateway, the network gateway operable to enforce the service level designation throughout the communications network.

17. The device of claim 16 further comprising a rule engine responsive to a quality of service (QoS) marking policy, the security agent operable to determine the service level according to the quality of service (QoS) marking policy for packets corresponding to the particular application, wherein the communications network is operable to apply the QoS appropriate treatment to message packets based on the determined service level.

18. The device of claim 17 wherein the user application is operable to encapsulate packets according to a stack, the stack indicative of control field mapping between an end user format and a physical network format operable to transport a message payload between the physical network and a user application operable to process a payload, the security agent operable to:
 identify transport attributes below the stack, indicative of packet characteristics specific to physical transport protocols independent of the user application and user originating the packets; and
 identify transport attributes above the stack, indicative of packet characteristics independent of transport source, destination, and protocol employed for the message packet.

19. The device of claim 14 further wherein the user device further comprises a trust boundary indicative of an extent of a trusted the particular node to the user device, the user device operable for quality of service (QoS) operation responsive to the service level designator.

20. The device of claim 19 wherein the security agent is operable to:
 assert, from the user device, that the security agent on the user device is operable to scrutinize packets emanating from the user device, the assertion receivable at a network gateway device; and
 identify, for each connection from the user device, the service level indicative of a service level settings operable to be stored in the service level designator.

21. The device of claim 20 wherein the service level designators define QoS markings, the security agent further operable to override QoS markings placed by a user application, the QoS markings replaced with markings corresponding to a security policy, the security policy based on at least one of source, destination, application, protocol, and port corresponding to the particular application.

22. A method of marking prioritized network traffic comprising:
 establishing a trusted environment operable to scrutinize network traffic sent via a particular node;
 communicating the establishment of the trusted environment to a data communications device coupled to a communications network;
 establishing a connection operable to transport network traffic to the communications network on behalf of a particular application; and
 setting a service level designator in each packet of the network traffic that is sent via the particular node; wherein the particular node is responsive to a service level in the service level designator for determining traffic priority;
 selectively enabling recognition of the service level designator in predetermined attributes of packets sent via the particular node;
 selectively identifying network traffic corresponding to the particular application;
 executing a security agent in the trusted environment for:
  identifying connections corresponding to user applications on a user device;
  scrutinizing all connections between the user device and the data communications device, the data communications device further comprising a network gateway operable to recognize and enforce the service level designator; and
  marking the service level designator in packets transported over the identified connections with corresponding service level markings according to a marking policy having predetermined values for setting the service level designator;
 wherein the method is performed by one or more processors.

23. A computer program product having a computer readable medium operable to store computer program logic embodied in computer program code encoded thereon as an encoded set of processor based instructions, comprising:
 computer program code for establishing a trusted environment operable to scrutinize network traffic sent via a particular node;
 computer program code for executing a security agent on a user device, the security agent operable to scrutinize network traffic emanating from the user device, and further operable to modify the service level designator;
 computer program code for communicating the establishment of the trusted environment to a data communications device coupled to a communications network;
 computer program code for setting a service level designator in each packet of the network traffic that is sent via the particular node; wherein the particular node is responsive to a service level in the service level designator for determining traffic priority;
 computer program code for selectively enabling recognition of the service level designator in predetermined attributes of packets sent via the particular node;
 computer program code for establishing a trusted connection from the security agent to a network gateway, the network gateway operable to enforce the service level designation throughout the secure network, the trusted connection operable to transport the network traffic to the communications network on behalf of a particular application;
 computer program code for selectively identifying the network traffic corresponding to the particular application.

24. A data communications device responsive to encoded processor based instructions for identifying prioritized network traffic comprising:
- one or more processors;
- means for establishing a trusted environment operable to scrutinize network traffic sent via a particular node;
- means for communicating the establishment of the trusted environment to a data communications device coupled to a communications network;
- means for establishing a connection operable to transport network traffic to the communications network on behalf of a particular application; and
- means for setting a service level designator in each packet of the network traffic that is sent via the particular node; wherein the particular node is responsive to a service level in the service level designator for determining traffic priority;
- means for selectively enabling recognition of the service level designator in predetermined attributes of packets sent via the particular node;
- means for selectively identifying network traffic corresponding to the particular application; the means for establishing the trusted environment including means for executing a security agent on a user device, the security agent further comprising:
- means for identifying connections corresponding to user applications on the user device;
- means for scrutinizing all connections between the user device and the data communications device, the data communications device further comprising a network gateway operable to recognize and enforce the service level designator; and
- means for marking the service level designator in packets transported over the identified connections with corresponding service level markings according to a marking policy having predetermined values for setting a service level design.

* * * * *